United States Patent [19]

King

[11] Patent Number: 5,106,235
[45] Date of Patent: Apr. 21, 1992

[54] WATERING SYSTEM

[76] Inventor: Lawrence B. King, 9043 Eureka Rd., Girard, Pa. 16417

[21] Appl. No.: 603,619

[22] Filed: Oct. 26, 1990

[51] Int. Cl.$^5$ .............. F16L 11/00; B05B 15/06; A01G 25/06
[52] U.S. Cl. ................. 405/154; 405/36; 405/43; 405/176; 239/271; 239/276; 239/201; 138/118
[58] Field of Search .............. 405/36, 43, 44, 45, 405/154, 174, 176; 239/201, 207, 271, 276; 138/103, 105, 118

[56] References Cited

U.S. PATENT DOCUMENTS

| 1,743,537 | 1/1930 | Freese . | |
|---|---|---|---|
| 2,657,096 | 10/1953 | Holmes . | |
| 2,757,962 | 8/1956 | MacLeod . | |
| 3,193,205 | 7/1965 | Hanson | 239/201 X |
| 3,227,408 | 1/1966 | Reed . | |
| 3,239,174 | 3/1966 | Churchman . | |
| 3,240,233 | 3/1966 | Johnston | 138/118 X |
| 3,304,038 | 2/1967 | Guthrie . | |
| 3,387,786 | 6/1968 | Rynberk | 239/201 |
| 3,473,770 | 10/1969 | Edgerton . | |
| 3,485,449 | 12/1969 | Wilson | 239/201 |
| 3,539,106 | 11/1970 | Ramik . | |
| 3,567,134 | 3/1971 | Smith . | |
| 3,588,012 | 6/1971 | Schaefer . | |
| 3,750,956 | 8/1973 | Mastman . | |
| 3,823,905 | 7/1974 | Ray . | |
| 3,860,177 | 1/1975 | Huffaker . | |
| 3,904,121 | 9/1975 | Geagan . | |
| 3,908,909 | 9/1975 | Kaatz . | |
| 4,135,668 | 1/1979 | Winkler et al. . | |
| 4,168,799 | 9/1979 | Turner . | |
| 4,281,473 | 8/1981 | Emalfarb et al. | 239/201 X |
| 4,778,111 | 10/1988 | Leap | 239/536 |
| 4,779,800 | 10/1988 | Tuomi | 239/276 |
| 4,824,019 | 4/1989 | Lew | 239/201 |

FOREIGN PATENT DOCUMENTS 8607124 12/1986 World Int. Prop. O. ......... 138/118

Primary Examiner—Dennis L. Taylor
Assistant Examiner—John Ricci
Attorney, Agent, or Firm—Charles L. Lovercheck; Wayne L. Lovercheck

[57] ABSTRACT

A conduit and method of installing water conduits, electrical conduits or drainage conduits in soil. The conduit has a hollow body with a flat top, an integral upper flange and a wedge-shaped integral lower flange, adapted to be received or forced into the soil to provide a watering system or the like with the flange flush with the top of the soil.

9 Claims, 3 Drawing Sheets

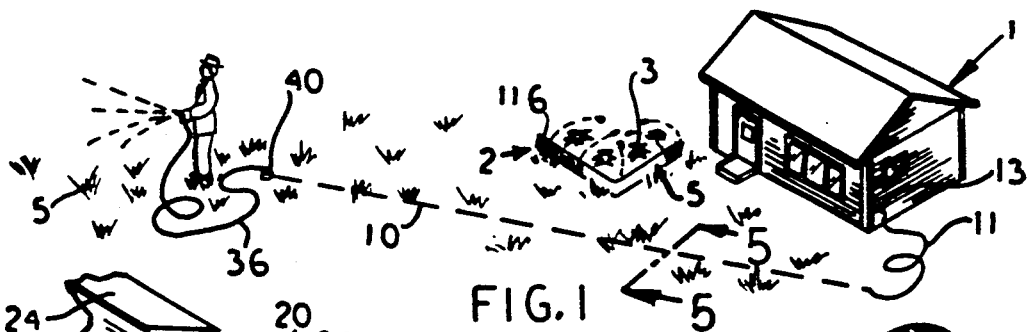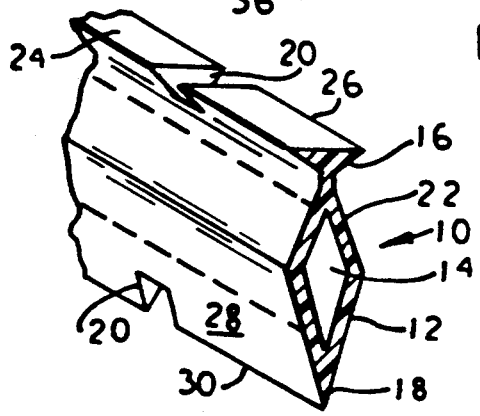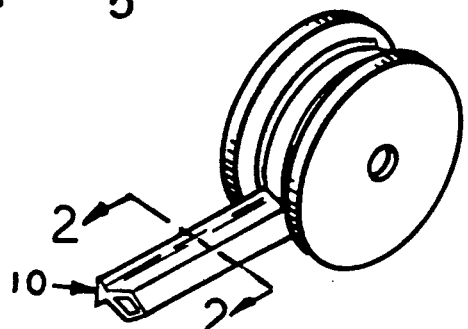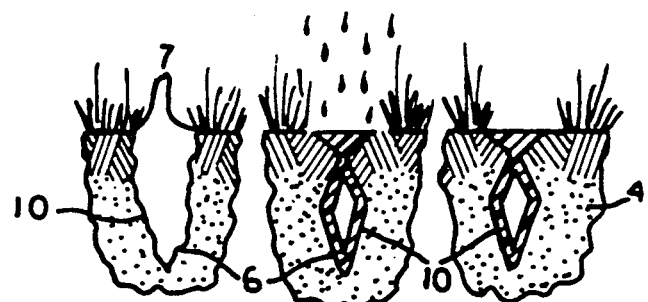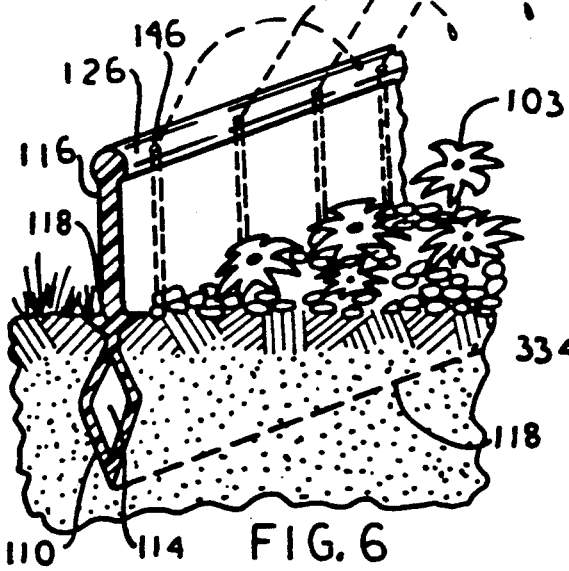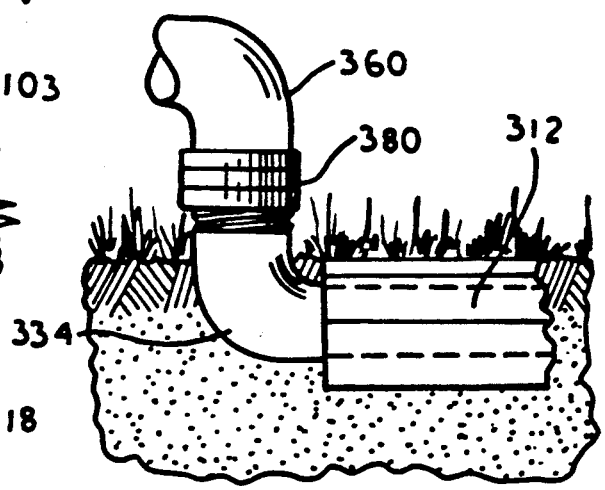

WATERING SYSTEM

BACKGROUND OF THE INVENTION

This invention relates to conduits, and more particularly to conduits and hoses for conducting water in a lawn, nursery, greenhouse or the like to a sprinkler hose, nozzle conduit or the like. The conduit according to the invention can also be used for conducting liquids of any kind, generally in any suitable environment.

Applicant is aware of the following Patents: U.S. Pat. Nos. 1,743,537 to Freese, 2,657,096 to Holmes, 2,757,962 to MacLeod, 3,227,408 to Reed, 3,239,174 to Churchman, 3,304,038 to Guthrie, 3,473,770 to Edgerton, 3,539,106 to Ramik, 3,567,134 to Smith, 3,588,012 to Schaefer, 3,750,956 to Mastman, 3,823,905 to Rauy, 3,860,177 to Huffaker, 3,904,121 to Geagan, 3,908,909 to Kaatz, 4,135,668 to Winkler et al, 4,168,799 to Turner, 4,778,111 to Leap and 4,779,800 to Tuomi. None of the above Patents shows applicant's idea of having a continuous top bearing surface and an integral flange attached to the hose which may be pressed into the ground to support the hose in position for watering.

STATEMENT OF THE INVENTION

The conduit of the present invention is in the form of an elongated hollow body having a generally wedge-shaped upper flange attached to the body and a longitudinally extending lower flange fixed to the body which extends along the length of the body. The upper flange may be generally wedge-shaped and has a flat top providing a convenient surface to be engaged by the foot of a user or the flat surface may be struck by a mallet to force the conduit into the ground. The upper part of the sides of the conduit are inclined inwardly and the lower sides incline downwardly to join the upper outwardly extending shoulders on the upper part of the flange. The lower flange is wedge-shaped and the conduit is to be inserted into the earth to stabilize the conduit. The entire conduit may be pressed into the earth either in a soft ground, or may be placed in a trench and partly covered in the earth. The side to side flexibility of the conduit allows the conduit to be directed around obstacles. The conduit could be pulled out of the ground and inserted elsewhere in any accessible area.

The conduit may have openings in the top or side for water to escape for soaking or for sprinkling or draining. The conduit may be made of a semi-rigid thermoplastic extended or molded material which can be rolled on a hose reel or the like with the conduit twisted so that the broad side of the elongated wedge can be rolled up on the reel. The upper flange can have soaker openings in it to allow water to escape for sprinkling from the length of the conduit and the one end of the conduit can be attached to a water supply and the discharge end can be attached to a sprinkling hose.

The hollow flow passage of the body of the conduit can be round, square, cylindrical, elliptical or any other suitable shape since the main thrust of the invention is to provide an economical conduit and an economical way to install a conduit for the purposes of moving water or other materials from one point to another instead of the problem of moving garden hoses around and causing the trouble of using a ditch witch or backhoe and the inconvenience of scaring of the landscaping resulting from installing round pipe.

It is an object of the invention to provide an improved sprinkling system.

Another object of the invention is to provide an improved conduit system.

Another object of the invention is to provide a design of conduit that is simple in construction, economical to manufacture and simple and efficient to use.

Another object of the invention is to provide a conduit that can be pressed or driven into the ground.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING

FIG. 1 is an isometric view of a house and a water hose, including the conduit and other areas to be watered, according to the invention.

FIG. 2 is an isometric cross sectional view taken on line 2—2 of FIG. 3.

FIG. 3 is an isometric view of the conduit partly rolled onto a hose reel, according to the invention.

FIG. 4 ids an isometric view of a fitting guard.

FIG. 5a is a cross sectional view taken on line 5—5 of FIG. 1 showing a section of earth with a slot formed therein to receive the conduit, according to the invention.

FIG. 5b is a lateral cross sectional view, similar to FIG. 5a, of the conduit shown in the slot of FIG. 5a, according to the invention.

FIG. 5c is a lateral cross sectional view, similar to FIG. 5b, of the conduit.

FIG. 6 is an isometric lateral cross sectional view, similar to FIGS. 5a, 5b and 5c, of another embodiment of the invention.

FIG. 7 is an enlarged longitudinal side view of the conduit in the soil with a hose attached to the conduit by means of a fitting, according to the invention.

FIG. 13 is a top view of the fitting shown in FIG. 11a.

FIG. 15 is a cross sectional view taken on line 15—15 of FIG. 15a.

FIG. 17 is a cross sectional view taken on line 17—17 of FIG. 11a.

DETAILED DESCRIPTION OF THE DRAWING

Figure 8:
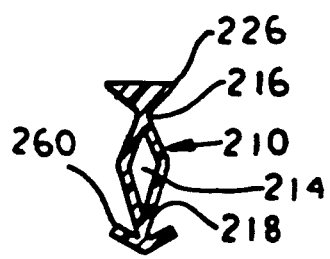
FIG. 8 is a cross sectional view, similar to FIG. 2, of another embodiment of the invention.

Now with more particular reference to the drawing, dwelling house 1 is shown in lawn 5, having flower bed 2 containing plants 3 and soil 4 having top surface 7. In FIG. 1, conduit 10 is shown extending from hose 11 attached to sill cock 13.

In FIG. 2, conduit 10 is shown in lateral cross section as having body 12 with hollow flow passage 14, upper flange 16 integrally attached to body 12 and lower flange 18 integrally attached to lower edge 30 of lower flange 18. Upper flange 16 has spaced notched 20 for stress relief and to make it easier to reel conduit 10. Upper flange 16 has flat top 26 with first downwardly, inwardly and outwardly inclined shoulder 22, upper upwardly inclined second shoulder 24. Lower flange 18 has upwardly and outwardly inclining lower sides 28 which terminate in relatively sharp lower edge 30. Hollow flow passage 14 of body 12 of conduit 10 may be round, square, cylindrical, elliptical or any other suitable shape.

Pedestal 40 in FIG. 4 has ground insertable legs 42 which may be set over the end of garden hose 36 and notch 44 of pedestal 40 receives garden hose 36 to hold conduit 10 in position.

To install conduit 10, according to the invention, slot 6 may be formed in soil 4 to receive conduit 10 as shown in FIGS. 5b and 5c. Soil 4 can then be packed around conduit 10 as shown in FIG. 5c. Flat top 26 of conduit 10 is suitable to be placed flush with top surface 7 to make conduit 10 less of an obstacle to people who may walk over the area. Spaced notches 20 of upper flange 16 and lower flange 18 provide up and down flexibility of conduit 10.

Top shoulder 22 may be held down by pedestal 40 to prevent conduit 10 from working its way up after top surface 7 has settled and conformed to the shape of conduit 10. Lower edge 30 is wedge-shaped as indicated in FIGS. 2, 3 and 5 through 7 which makes ground inserting easier and tends to limit conduit 10 from working its way down into soil 4.

In the embodiment of FIG. 6, upper flange 116 is integrally attached to flat top 126 of conduit 110 for carrying the water above the roots of plants 103 for better sprinkling. Equally spaced holes 146 may be formed in upper flange 116 of conduit 110 and extend down to flow passage 114 providing water passages. Lower flange 118 is attached to upper flange 116 adjacent flow passage 114.

As shown in FIG. 7, conduit 10 may have a nipple of any suitable fitting molded into or attached to the lower part of body 312 and connected to elbow fittings 334 which may be plastic or metal. Ordinary garden hose 360 with a fitting 380, or the like, is applied to elbow fittings 334.

FIG. 8 shows another embodiment of the invention wherein conduit 210 has hollow flow passage 214 which is shaped like hollow flow passage 114 shown in the embodiment of FIG. 6. Upper flange 216 and top 226 are similar to flange 16 and top 26 shown in FIG. 2; however, upwardly and outwardly extending flanges 260 are attached to the lower end of lower flange 218.

Figure 9:
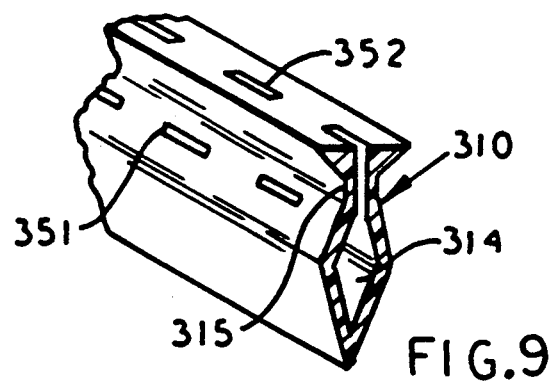
FIG. 9 is an isometric cross sectional view, similar to FIG. 2, of another embodiment of the invention.

FIG. 9 shows another embodiment of the invention wherein conduit 310 has generally the same cross section as FIG. 5 but water channel 315 connects first slots 352 with flow passage 314 and to second slots 351.

Figure 10:
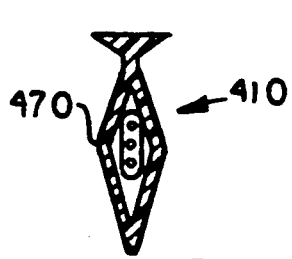
FIG. 10 is a cross sectional view, similar to FIG. 8, of another embodiment of the invention.
Figure 11:
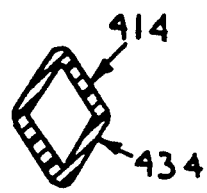
FIG. 11 is a cross sectional view taken on line 11—11 of FIG. 13, showing a ground to surface 90 degree elbow connected to the conduit.
Figure 11A:
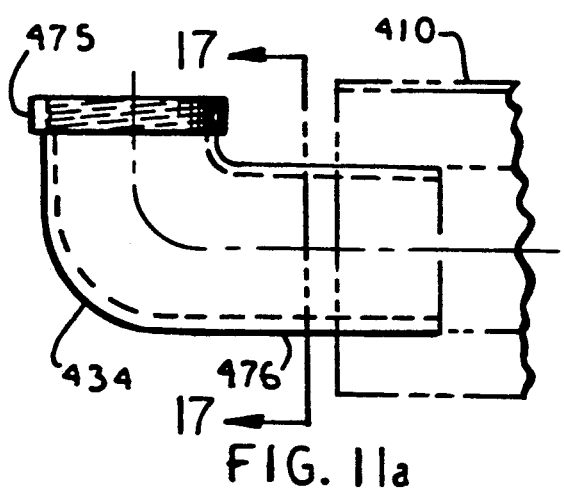
FIG. 11a is a side view of the conduit with a ground to surface elbow, according to the invention.

FIG. 10 shows conduit 410 having electrical lines 470 therein.

Figure 12:
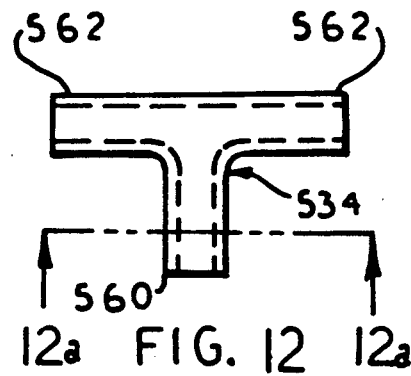
FIG. 12 shows a tee fitting, according to the invention.
Figure 12A:
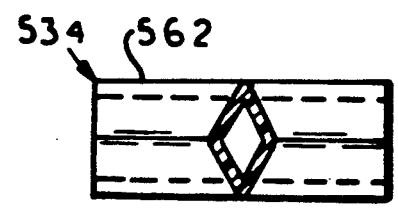
FIG. 12a is a cross sectional view taken on line 12—12 of FIG. 12.
Figure 13:
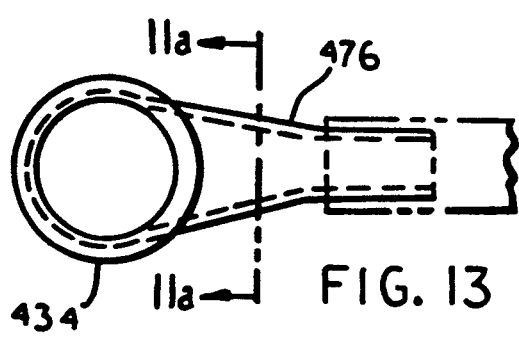

FIGS. 11, 11a, 13 and 17 show enlarged views of elbow fittings 434 having threaded first end 475 and second end 476 shaped to fit into conduit 410. Elbow fittings 434 could be replaced by "T" fitting 534 having ends 560 and 562 as shown in FIGS. 12 and 12a.

Figure 14:
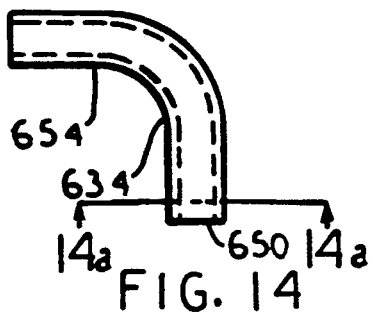
FIG. 14 is a side view of an underground 90 degree elbow, according to the invention.
Figure 15A:
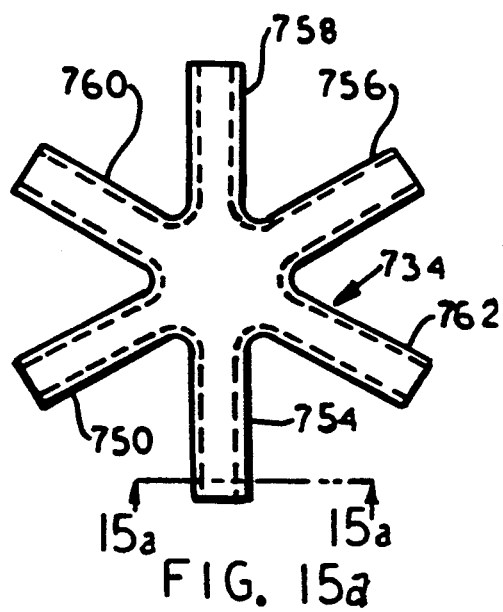
FIG. 15a is a top view of the multi-part manifold according to the invention.
Figure 14A:
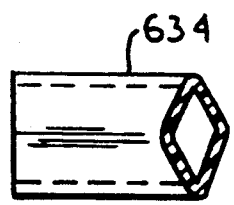
FIG. 14a is a cross sectional view taken on line 14—14 of FIG. 14.
Figure 15:
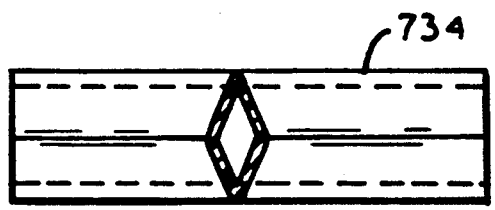

Underground elbow 634, having ends 650 and 654, is shown in FIGS. 14 and 14a.

Manifold 734, has ends 750, 762, 754, 756, 758 and 760 all shaped to be received in a hollow flow passage such as flow passage 14 as shown in FIG. 2.

Figure 16:
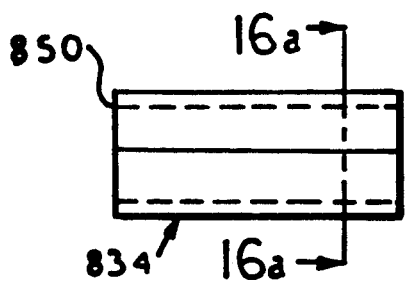
FIG. 16 shows a coupling of another embodiment of the invention.
Figure 16A:
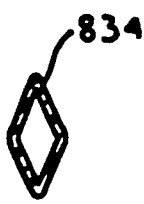
FIG. 16a is a cross sectional view taken on line 16—16 of FIG. 16.
Figure 17:
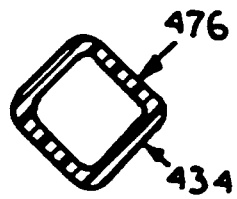

Coupling 834 is shown in the embodiment of FIG. 16 as having cylindrical ends 850 which may be of a shape suitable to be received in the end of a conduit similar to conduit 12 of FIG. 2. The outside surface of coupling 834 will be compatible with the shape of the inside of the conduit.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A one-piece conduit for distributing liquid comprising an elongated hollow body having a hollow flow passage generally diamond shaped in cross section and having a first end and a second end;
   an upper flange integrally attached to said body and extending vertically substantially continuously along the length of said body from said first end to said second end;
   said upper flange having a relatively flat top and side surfaces extending downwardly and inwardly from said relatively flat top;
   said body having relatively flat upper side surfaces extending downwardly and outwardly from said downwardly and inwardly side surfaces and defining an upwardly facing shoulder at each side of said body;
   said shoulders being adapted to support soil to hold said conduit in place;
   downwardly and inwardly extending lower side surfaces extending from said upper side surfaces of said body and meeting at a relatively sharp lower edge;
   said lower side surfaces of said body extending downwardly and inwardly from said shoulders defining a lower flange which terminates in said relatively sharp lower edge and defining said lower flange;
   said lower flange being integrally attached to said body and extending downwardly along the length of said conduit opposite said upper flange;
   said flat top being adapted to receive pressure from a foot or mallet-like instrument to force said lower flange into said soil.
   said upper flange being adapted to be disposed below said soil with said flat top of said upper flange flush with the top surface or said soil when said conduit is installed in said soil.

2. The conduit recited in claim 1 wherein said upper flange has spaced holes therein communicating with said hollow flow passage of said body.

3. The conduit recited in claim 1 wherein spaced holes are formed in said body communicating with said hollow flow passage for providing a soaker hose.

4. The conduit recited in claim 1 wherein said conduit has longitudinally spaced notches to facilitate reeling said conduit.

5. The conduit recited in claim 1 wherein said conduit has a fitting attached to one end;
   said fitting having a first end and a second end;
   said first end of said fitting having connecting means for connecting said conduit thereto;
   said second end of said fitting having a non-circular shape adapted to be received in said flow passage in said conduit; and,
   said second end having a shape generally complementary to said shape of said conduit.

6. The conduit recited in claim 5 wherein said connecting means is threaded.

7. The conduit recited in claim 5 wherein said fitting is generally in the form of an elbow.

8. The conduit recited in claim 5 wherein said fitting is a manifold.

9. The conduit recited in claim 5 wherein said fitting is T-shaped; and,
   said fitting being shaped to be received in said flow passage of said conduit.

* * * * *